United States Patent
Tang et al.

(10) Patent No.: US 11,744,183 B2
(45) Date of Patent: Sep. 5, 2023

(54) SORGHUM CUTTING HEADER AND SORGHUM HARVESTER WITH LARGE FEED VOLUME AND MULTIPLE REELING PANS

(71) Applicant: Jiangsu University, Jiangsu (CN)

(72) Inventors: Zhong Tang, Jiangsu (CN); Yaquan Liang, Jiangsu (CN); Xin Liu, Jiangsu (CN); Yu Li, Jiangsu (CN)

(73) Assignee: Jiangsu University, Jiangsu (CN)

( * ) Notice: Subject to any disclaimer, the term of this patent is extended or adjusted under 35 U.S.C. 154(b) by 3 days.

(21) Appl. No.: 17/622,866

(22) PCT Filed: Sep. 28, 2020

(86) PCT No.: PCT/CN2020/118313
§ 371 (c)(1),
(2) Date: Dec. 27, 2021

(87) PCT Pub. No.: WO2022/061862
PCT Pub. Date: Mar. 31, 2022

(65) Prior Publication Data
US 2022/0330483 A1    Oct. 20, 2022

(30) Foreign Application Priority Data

Sep. 22, 2020    (CN) .......................... 202011001958.4

(51) Int. Cl.
*A01D 57/02*    (2006.01)
*A01D 43/08*    (2006.01)
(Continued)

(52) U.S. Cl.
CPC ............. *A01D 57/02* (2013.01); *A01D 43/08* (2013.01); *A01D 45/003* (2013.01); *A01D 47/00* (2013.01);
(Continued)

(58) Field of Classification Search
CPC .... A01D 43/063; A01D 57/025; A01D 69/03; A01D 69/06; A01D 43/087; A01D 47/00; A01D 45/003
See application file for complete search history.

(56) References Cited

U.S. PATENT DOCUMENTS 2,706,882 A * 4/1955 Thornton, Jr. ......... A01D 41/14
56/238
3,058,283 A * 10/1962 Hume .................... A01D 47/00
56/14.4
(Continued)

FOREIGN PATENT DOCUMENTS

| CN | 201515609 | 6/2010 |
|----|-----------|--------|
| CN | 104429336 | 3/2015 |

(Continued)

OTHER PUBLICATIONS

"International Search Report (Form PCT/ISA/210)" of PCT/CN2020/118313, dated Sep. 26, 2021, pp. 1-5.
(Continued)

*Primary Examiner* — Thomas B Will
*Assistant Examiner* — Joan D Misa
(74) *Attorney, Agent, or Firm* — JCIP GLOBAL INC.

(57) ABSTRACT

A sorghum cutting header and a sorghum harvester with large feed volume and multiple reeling pans includes a reeling header, a rod crushing device, and a reciprocating cutter device. The rod crushing device is located under the reeling header. The reeling header includes reeling pans, frame rods, bearing seats, reeling pan shafts, tandem shafts, and tandem shaft bearing seats. The reeling pan shafts are installed in parallel on the frame rod through bearing seats. The adjacent reeling pan shafts are in transmission connection, and at least one reeling pan shaft is in transmission connection with the power device. An inner part of any reeling pan shaft penetrates the tandem shafts. Both ends of
(Continued)

the tandem shafts are supported on the frame rods, and one end of the tandem shafts is fixed on the tandem shaft bearing seats. The reeling pans are mounted on any reeling pan shaft.

10 Claims, 12 Drawing Sheets

(51) Int. Cl.
*A01D 47/00* (2006.01)
*A01D 45/00* (2018.01)
*A01D 57/03* (2006.01)
*A01D 43/063* (2006.01)
*A01D 69/03* (2006.01)
*A01D 69/06* (2006.01)

(52) U.S. Cl.
CPC ........... *A01D 57/025* (2013.01); *A01D 57/03* (2013.01); *A01D 43/063* (2013.01); *A01D 69/03* (2013.01); *A01D 69/06* (2013.01)

(56) References Cited

U.S. PATENT DOCUMENTS

| | | | | |
|---|---|---|---|---|
| 3,399,517 A | * | 9/1968 | Magee | A01D 47/00 56/238 |
| 3,841,072 A | * | 10/1974 | Hudson | A01D 47/00 56/51 |
| 5,131,216 A | * | 7/1992 | Otten | A01D 45/10 56/63 |
| 7,131,253 B2 | | 11/2006 | Remillard et al. | |
| 7,377,091 B2 | * | 5/2008 | Shelton | A01D 45/021 56/119 |
| 7,398,638 B2 | * | 7/2008 | Malmros | A01D 41/08 56/56 |
| 7,681,388 B1 | * | 3/2010 | Hinds | A01D 47/00 56/126 |
| 7,694,501 B1 | * | 4/2010 | Hinds | A01D 47/00 56/62 |
| 8,220,236 B1 | * | 7/2012 | Benner | A01D 45/003 56/63 |
| 9,788,486 B2 | * | 10/2017 | Magisson | A01D 41/14 |
| 10,595,463 B2 | * | 3/2020 | Walker | A01D 57/06 |
| 2018/0192588 A1 | | 7/2018 | VanNahmen | |
| 2020/0288630 A1 | * | 9/2020 | Gregg | A01D 47/00 |

FOREIGN PATENT DOCUMENTS

| | | |
|---|---|---|
| CN | 106090168 | 11/2016 |
| CN | 106612901 | 5/2017 |
| CN | 107750591 | 3/2018 |
| CN | 110637595 | 1/2020 |
| EP | 2210468 | 7/2010 |

OTHER PUBLICATIONS

"Written Opinion of the International Searching Authority (Form PCT/ISA/237)" of PCT/CN2020/118313, dated Sep. 26, 2021, pp. 1-3.

* cited by examiner

SORGHUM CUTTING HEADER AND SORGHUM HARVESTER WITH LARGE FEED VOLUME AND MULTIPLE REELING PANS

CROSS-REFERENCE TO RELATED APPLICATION

This application is a 371 of international application of PCT application serial no. PCT/CN2020/118313, filed on Sep. 28, 2020 which claims the priority benefit of China application no. 202011001958.4, filed on Sep. 22, 2020. The entirety of each of the above mentioned patent applications is hereby incorporated by reference herein and made a part of this specification.

TECHNICAL FIELD

The present invention belongs to the field of agricultural machinery or the field of special agricultural equipment for sorghum crops, and particularly relates to a sorghum cutting header and a sorghum harvester with large feed volume and multiple reeling pans.

DESCRIPTION OF RELATED ART

Sorghum crops have a wide range of uses, which can be used for food, brewing, feeding, and bioenergy. For different purposes, the biological characteristics of sorghum are also different. Sorghum has the characteristics of long stalks, narrow leaves, strong drought resistance and lodging resistance. When sorghum is used for food and brewing, sorghum ears are the main harvest object, so the sorghum ears planted are full and compact. From the planting area and planting scope, the sorghum planting industry still has a great demand for ear harvest.

Compared with rice, sorghum has larger plants, longer stalks and higher ears. Therefore, when using harvesting machinery to harvest heads, a higher header is required for harvesting. The sorghum stalk has solid fibers inside, which is different from the hollow stalks of rice, so it has a strong bearing capacity for ears. When the sorghum is mature, the ears are compact, but the stalks can still bear the quality of the ears, ensuring that the ears are upright, which is different from the drooping of the ears of rice, so the height of the ears of sorghum is not uniform. When eccentric reel is used to harvest sorghum, short plants will be missed and tall plants will be damaged. In addition, the traditional eccentric reel has a large radius and a large moment of inertia. When it is lifted to a higher height, the vibration amplitude is large, which would impact the ear head and destroy the integrity of the ear head.

With the continuous advancement of the process of agricultural mechanization, agricultural harvesting machinery continues to be large-scaled and specialized. At present, the corresponding harvesting machinery is mainly researched and manufactured for major economic crops such as rice, wheat, rape, and corn. In recent years, the planting area of sorghum has continued to increase. However, there are few professional harvesters for sorghum harvesting, mainly using rice harvesting machinery. The diameter of the rice reel is large, which makes its own moment of inertia larger. When it is used to harvest sorghum, it is necessary to raise the header to a higher height. At this time, the rack rod on which the reel is installed is equivalent to a cantilever beam. When the harvester is working, the header is very sensitive to the load and has a large amplitude. Therefore, it is necessary to find a harvesting machine for sorghum to meet the harvesting demand of sorghum.

In recent years, with the continuous development of combine harvesters, research on sorghum harvesting machinery is also constantly advancing. Sorghum cannot be threshed in the same way as the traditional combined harvesting method. It is more inclined to be further processed according to the subsequent use of the harvested sorghum. The Chinese patent discloses a sorghum harvester that can be installed on a tractor. It adopts the header structure of a traditional harvester, in which the height of the header can be adjusted and has a certain versatility. It is applied to the harvesting of sorghum by increasing the height of the header. The Chinese patent discloses a sorghum harvester that uses a triangular material rack to move the moving object. After the material enters the dumping bin, the blade is moved to complete the cutting, and the material is transported into the grain bin by the auger and conveyor belt. The Chinese patent discloses a harvesting platform for harvesting machines and a harvesting platform for agricultural machines. It use rollers and cutting discs to complete the overall harvest of high-stalk crops, which can be used for the harvesting of high-stalk crops such as sweet sorghum and sugarcane.

The above invention can achieve the harvest of sorghum under specific conditions, but there are still certain problems. Due to the large height of the harvesting mechanism, the reel header has a large moment of inertia during the working process, which ultimately leads to large vibrations. The overall harvesting of sorghum harvesters is difficult to ensure the integrity of the heads, and the harvest quality is difficult to meet the subsequent processing needs. Since the harvest of sorghum is mainly for the head part, when harvesting on the header, the harvesting of the stalk will increase the power consumption and mechanical load, which will accelerate the loss of machine life and reduce economic efficiency. After the sorghum is harvested with a high header, there is no measure to treat the stalks at the lower part, which causes more processes to be required to remove the stalks, resulting in a prolonged operation cycle and affecting subsequent planting.

SUMMARY

Aiming at the deficiencies in the prior art, the present invention provides a sorghum cutting header and a sorghum harvester with large feed volume and multiple reeling pans. It can not only complete the harvest, but also ensure the integrity of sorghum head, and the harvest quality and harvest efficiency can meet the requirements. On this basis, the stalk after cutting the head can be crushed and returned to the field at the same time to reduce the work process.

The present invention achieves the above technical objectives through the following technical means.

A sorghum cutting header with large feed volume and multiple reeling pans comprises a reeling header, a rod crushing device and a reciprocating cutter device. The reciprocating cutter device is used for cutting sorghum heads pulled by the reeling header, and the rod crushing device is located under the reeling header and is used for cutting the remaining sorghum stalks.

The reeling header comprises reeling pans, a frame rod, bearing seats, reeling pan shafts, a tandem shaft and tandem shaft bearing seats. A number of reeling pan shafts are installed in parallel on the frame rod through the bearing seats, and the adjacent reeling pan shafts are in transmission connection, a power device is transmitted to at least one of the reeling pan shafts through chain drive. The tandem shaft penetrates inside any one of the reeling pan shafts, and two ends of the tandem shaft are supported on the frame rod through the tandem shaft bearing seat, and one end of the tandem shaft is fixed on the frame rod. Any one of the reeling pan shafts are mounted with a number of the reeling pans.

In the above solution, any one of the reeling pans comprises a central gear, planetary gears, elastic teeth, a reeling pan shell, planetary gear shafts and elastic tooth rods. The reeling pan shell is mounted on the reeling pan shaft, the central gear is mounted on the tandem shaft, and the central gear is located on a center of reeling pan shell. A number of the planetary gears are evenly distributed in the center of the reeling pan shell, and a number of the planetary gears mesh with the central gear. The planetary gears are mounted on the reeling pan shell through the planetary gear shaft, and the reeling pan shell rotates to make the planetary gears rotate around the central gear. A number of the elastic tooth rods penetrating the reeling pan shell are installed on the edge of the reeling pan shell, and the elastic tooth rods correspond to the planetary gears, and any one of the elastic tooth rod and its corresponding planetary gear are drivingly connected. The elastic tooth rod is provided with elastic teeth, and the elastic teeth on the same reeling pan rotate synchronously, and the direction of the elastic teeth remains unchanged during the rotation.

In the above solution, one end of any one of the reeling pan shafts is equipped with a double row sprocket, any one of the reeling pan shafts and an adjacent one of the reeling pan shafts are connected by chain drive.

In the above solution, the reeling header further comprises a device for adjusting an angle of elastic teeth, and the device for adjusting the angle of elastic teeth comprises a stepping motor and a brake. The brake is used to selectively fix the tandem shaft and the frame rod. The tandem shaft is connected to the stepping motor in driving mode to adjust a phase angle of the tandem shaft when the brake is not working.

In the above solution, the reeling header further comprises a device for adjusting the angle of elastic teeth, and the device for adjusting the angle of elastic teeth comprises an adjusting disk and a flywheel, and one end of the tandem shaft is fixed on the frame rod through the adjusting disk. The flywheel is provided at one end of the tandem shaft, and the flywheel is coaxially fixed with the adjusting disk, and a phase angle of the tandem shaft is adjusted by manually rotating the flywheel.

In the above solution, 4-6 reeling pans are installed on any one of the reeling pan shafts, a center distance between the adjacent reeling pan shafts is 480 mm-550 mm, and an outer diameter of each reeling pan is 300 mm-350 mm. A length of the elastic tooth is 100 mm-150 mm. A distance between two adjacent elastic teeth along an axis is 120 mm-150 mm.

In the above solution, one end of the frame rod is equipped with a hydraulic rod for adjusting an inclination angle between a connecting line of shaft centers of the reeling pans and a horizontal plane, and an adjustment range is 5°-20°.

In the above solution, the rod crushing device comprises rod crushing knife groups, rod splitters, tool post hydraulic rods and a rod knife holder. The rod splitters and the rod crushing knife groups are installed in a staggered arrangement on the rod knife holder. One end of the tool post hydraulic rods is installed on the rod knife holder for adjusting a cutting angle.

In the above solution, each rod crushing knife group comprises stirring knife barrels, two stirring knife shafts, ring blades, upper stirring knife gears and lower stirring knife gears. The two stirring knife shafts are supported in parallel on the rod knife holder, and each stirring knife barrel is installed on each of the stirring knife shafts. Both ends of each stirring knife shaft are respectively equipped with an upper stirring knife gear and a lower stirring knife gear. The upper stirring knife gear and the lower stirring knife gear on one of the stirring knife shafts intermesh with the upper stirring knife gear and the lower stirring knife gear on the other one of the stirring knife shafts. The ring blades on the two stirring knife shafts are equally spaced, and cutting edges of the ring blades on the two stirring shafts are opposite. One of the stirring knife shafts is directly or indirectly connected to the power device.

A sorghum harvester comprises a reeling header, a reciprocating cutter device, a screw feeder, an ear head conveyor, a straw helper, an engine, a grain tank and a frame. One end of the reeling header is installed on the frame through a rotating pair, and the straw helper installed on the frame under the reeling header. The screw feeder is located behind the reciprocating cutter device. The ear head conveyor is installed at an outlet of the screw feeder, and is used to transport the sorghum head to the grain tank. The engine is used to provide the power of the reeling header, the screw feeder and the ear head conveyor respectively.

Compared with the prior art, the beneficial effects of the present invention are as follows.

1. The sorghum cutting header with large feed volume and multiple reeling pans according to the present invention designs a non-spoke header instead of the traditional reel, and removes the spokes of the traditional reel. The present invention is redesigned from the structure, while reducing the radius of the reeling pan, and it can still ensure its working requirements. This reduces the moment of inertia of the structure, thereby reducing vibration during work. Due to the high working position of the reeling header, reducing vibration can significantly improve the working stability of the harvester.

2. The sorghum cutting header with large feed volume and multiple reeling pans according to the present invention is provided with a plurality of reeling pan shafts transversely, and a plurality of reeling pans are installed on each reeling pan shaft. The mounting height of the reeling pan shaft is different during working. The horizontally arranged reeling pan shaft makes the contact stroke of the reeling pans with grain increase when the reeling pan is working. The direction of the elastic teeth of each reeling pan remains unchanged during the rotation, and the angle of the elastic teeth on each reeling pan shaft can be adjusted as a whole according to the actual working conditions, so as to achieve the best effect. Increasing the contact stroke between the sorghum head and the reeling header, and adjusting the angle of the elastic teeth on different reeling pan shaft can significantly optimize effect of harvester and ensure the complete shape of the ear head.

3. In the sorghum cutting header with large feed volume and multiple reeling pans according to the present invention, the transmission part is designed in each reeling pan, and the diameter of reeling pan is significantly reduced. The internal transmission system of reeling pan replaces the eccentric structure on the side of the combine harvester header, and the power can be directly transmitted to the reeling pan shaft through a chain drive. The use of a small-radius reeling pan eliminates the need for an eccentric structure, simplifies the transmission mode, reduces the mass, and makes the structure more compact.

4. In the sorghum cutting header with large feed volume and multiple reeling pans according to the present invention, a rod crushing device is installed under the reeling header. The rod crushing device is composed of several pairs of stirring knife barrels, and each group of stirring knife barrels rotates oppositely to complete the rod crushing work. By installing a rod crushing device, the subsequent work of removing stalks can be eliminated, and work efficiency is improved. At the same time, the stalks can be returned to the field, which significantly improves the economic efficiency.

5. In the sorghum cutting header with large feed volume and multiple reeling pans according to the present invention, a hydraulic lifting device is installed at the rear section of reeling header, which can adjust the extension angle of the reeling header. There are two tool post hydraulic rods behind the rod crushing device. By changing the length of the two tool post hydraulic rods, the position and inclination angle of the rod crushing device can be adjusted. A hydraulic rod is arranged near the driven wheel of the ear head conveyor to change the inclination angle of the conveyor belt. These hydraulic devices can enhance the adaptability of the device and improve the versatility of the sorghum harvester.

DESCRIPTION OF THE EMBODIMENTS

The present invention is further described below in conjunction with specific embodiments and the accompanying drawings, but the scope is not limited thereto.

Figure 1:
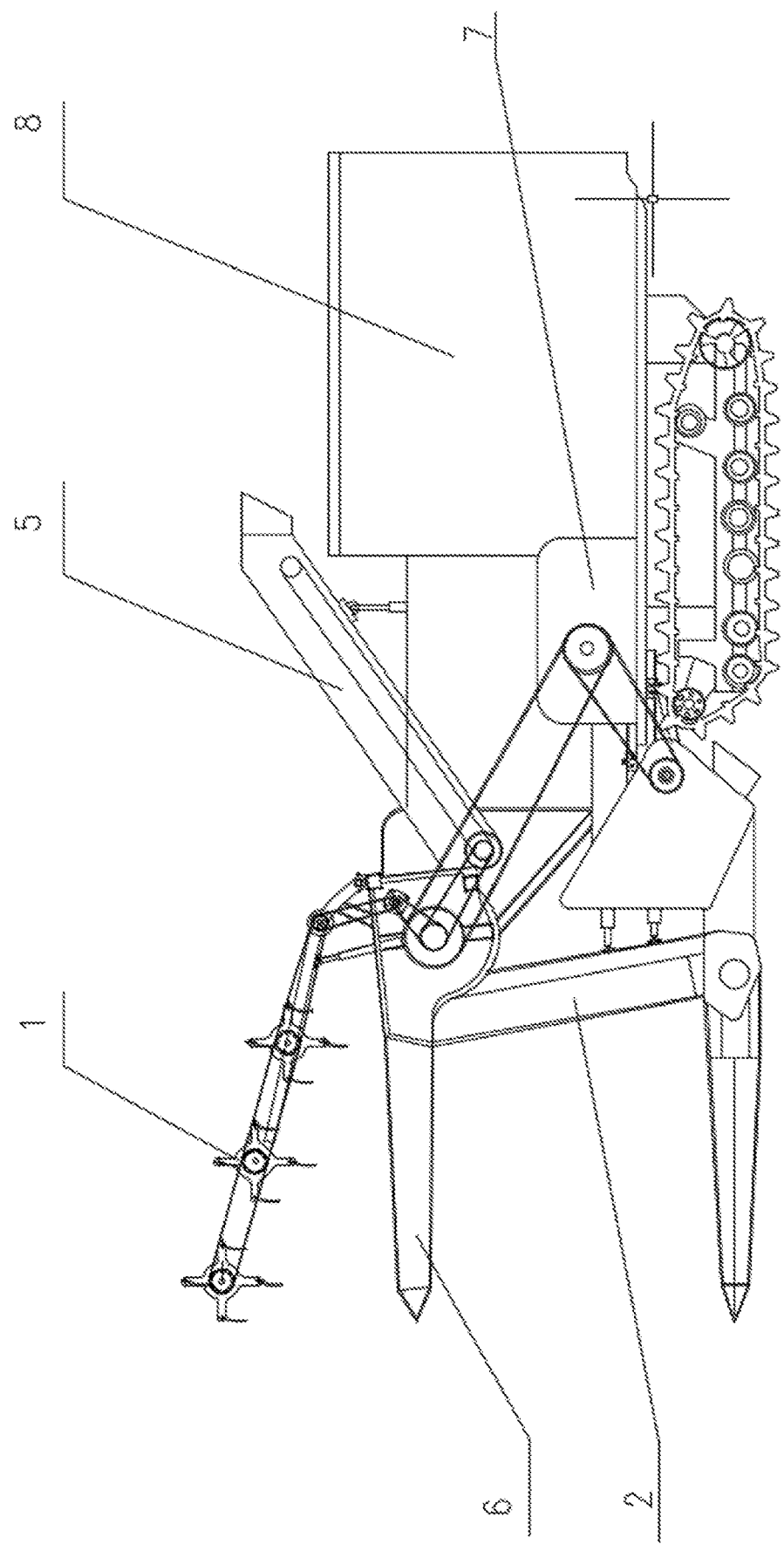
FIG. 1 is a front view of a sorghum harvester.
Figure 2:
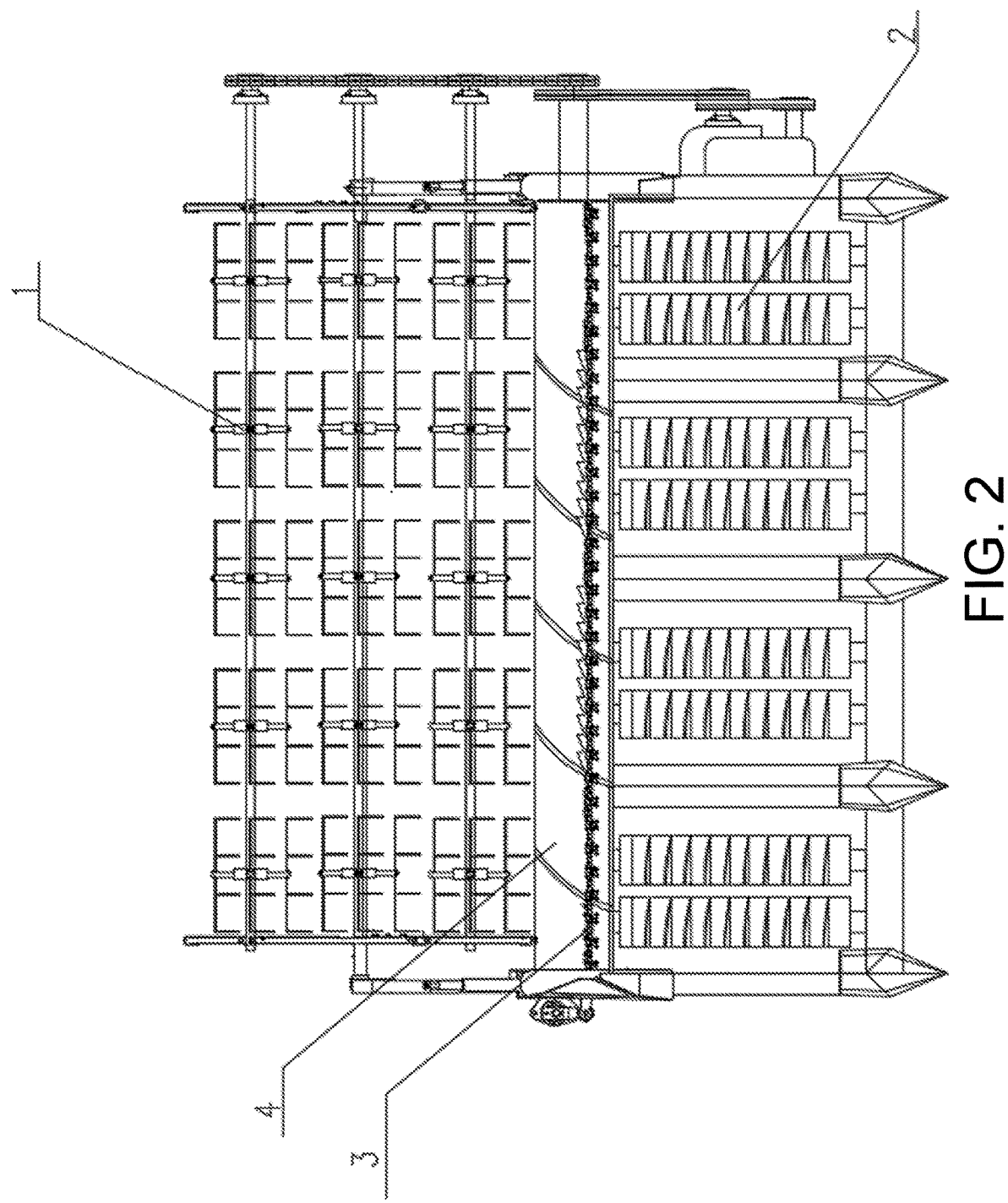
FIG. 2 is a left side view of the sorghum harvester.
Figure 3:
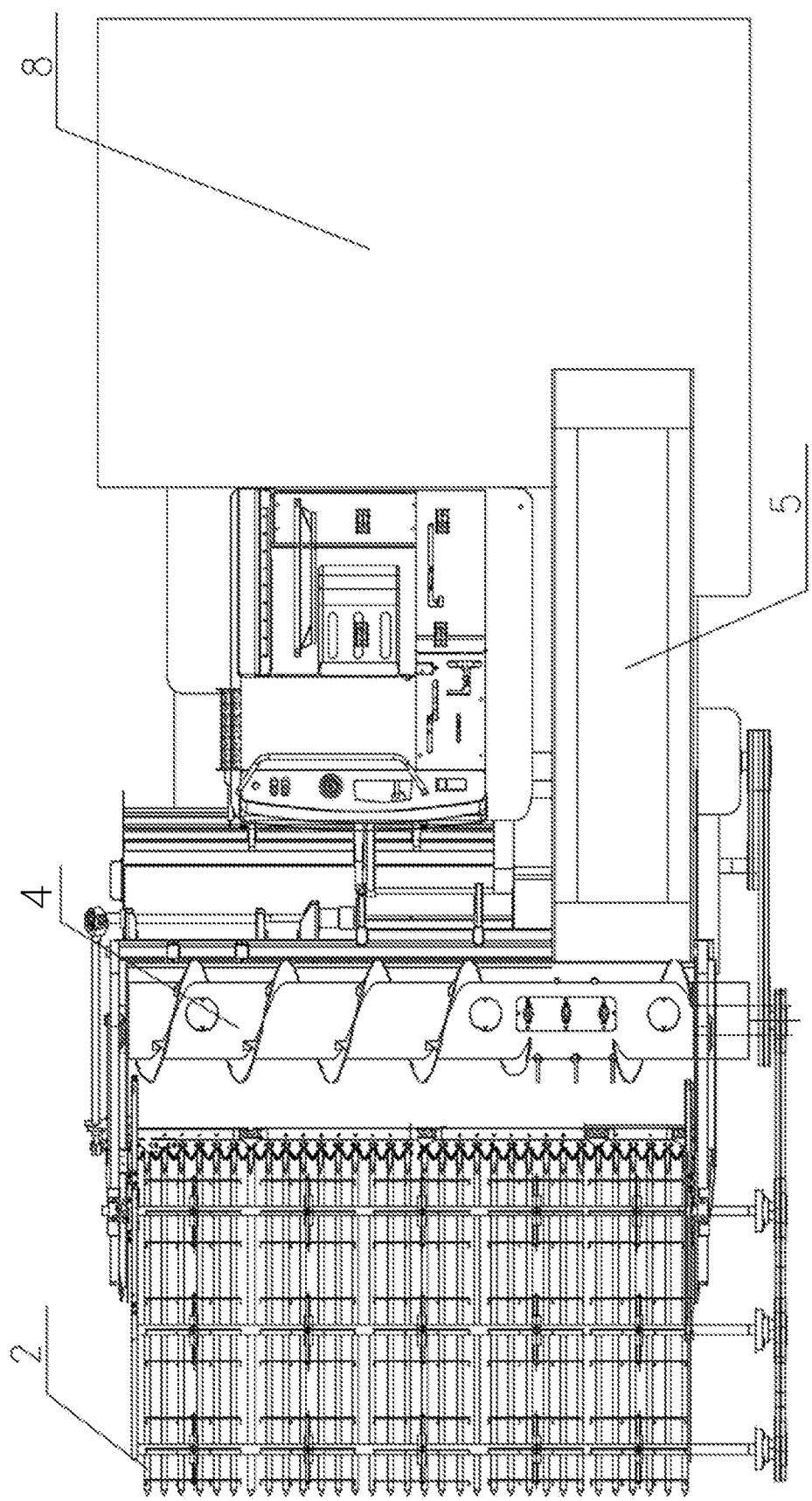
FIG. 3 is a top view of the sorghum harvester.

As shown in FIG. 1, FIG. 2 and FIG. 3, the sorghum harvester of the present invention comprises a sorghum cutting header, a screw feeder 4, an ear head conveyor 5, a straw helper 6, an engine 7, a grain tank 8 and a frame. The sorghum cutting header comprises a reeling header 1, a rod crushing device 2 and a reciprocating cutter device 3. The reciprocating cutter device 3 is used for cutting the ear heads pulled by the reeling header 1, and the rod crushing device 2 is located under the reeling header 1 and is used for cutting the remaining sorghum stalks. One end of the sorghum cutting header is installed on the frame through a rotating pair, and the straw helper 6 installed on the frame under the reeling header 1 of the sorghum cutting header. The screw feeder 4 is located behind the reciprocating cutter device 3 of the sorghum cutting header. The ear head conveyor 5 is installed at the outlet of the screw feeder 4, and is used to transport the sorghum head to the grain tank 8. The engine 7 is used to provide the power of sorghum reeling header, the feeding auger 4 and the ear head conveyor 5 respectively. The grain tank 8 and the engine 7 are fixedly installed on crawler chassis.

Figure 4:
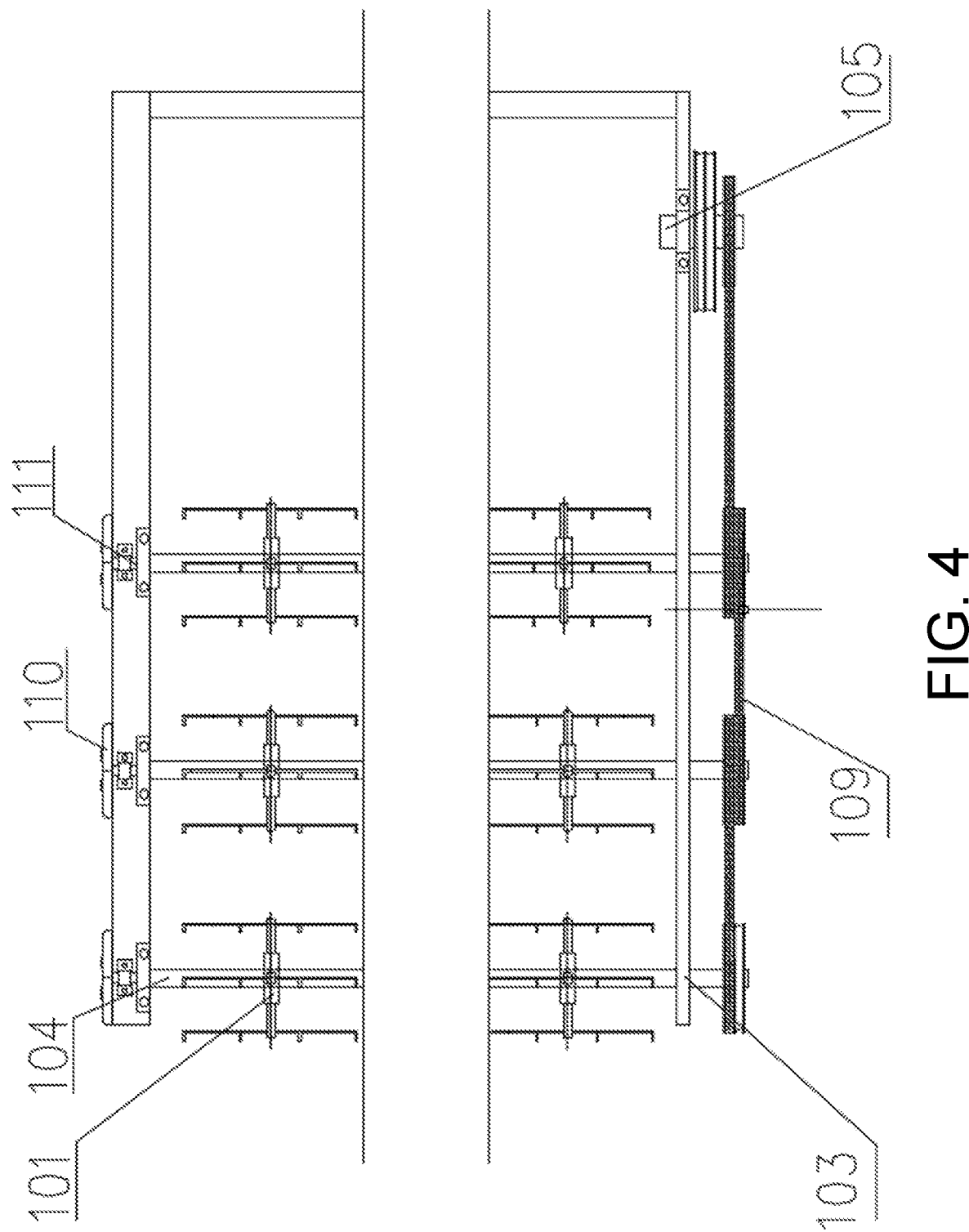
FIG. 4 is a top view of a reeling header.
Figure 5:
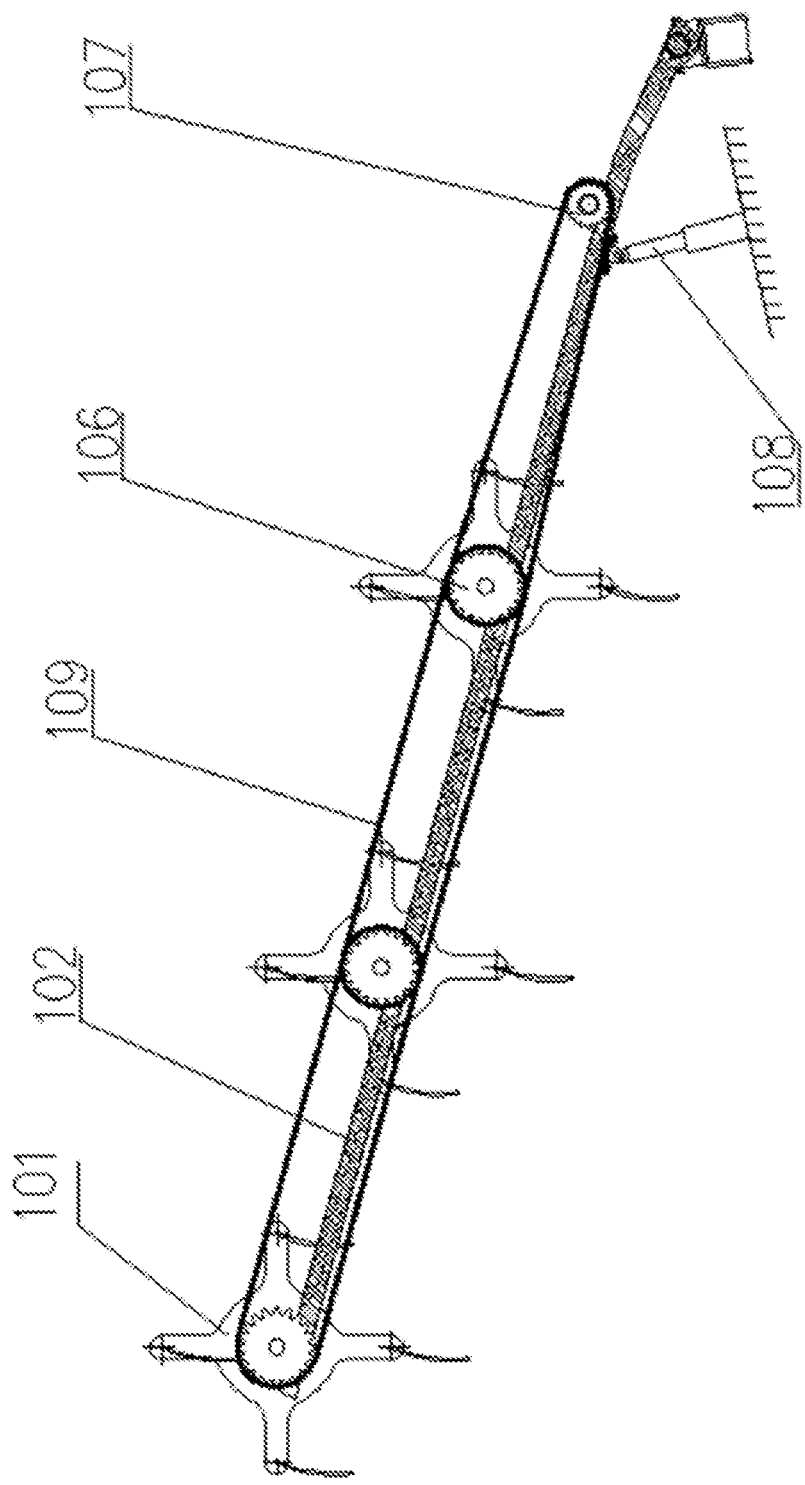
FIG. 5 is a schematic diagram of the transmission of the reeling header.

As shown in FIG. 4 and FIG. 5, The reeling header 1 comprises reeling pans 101, a frame rod 102, bearing seats 103, reeling pan shafts 104, a reeling header shaft 105, double row sprockets 106, a single row sprocket 107, a hydraulic rod 108, drive chains 109, an adjusting disk 110, tandem shafts 111 and tandem shaft bearing seats 112. One end of the frame rod 102 is hingedly mounted on the rack. The reeling pan shafts 104 are installed in parallel on the frame rod 102 using the bearing seat 103. The ends of the reeling pan shafts 104 are connected with a double row sprocket 106 through a key connection. The double row sprockets 106 on the adjacent reeling pan shafts 104 are connected in transmission by a drive chain 109. The reeling header shaft 105 is provided on the frame, and a single row sprocket 107 is mounted on the one side of reeling header shaft 105. The double row sprocket 106 and the single row sprocket 107 are drivingly connected by drive chain 109. The reeling header shaft 105 is directly or indirectly connected to the engine 7 through the drive chain 109. The reeling pan shaft 104 is a hollow shaft, and any one of the reeling pan shafts 104 has the tandem shaft 111 penetrating thereinside. The two ends of the tandem shaft 111 are supported on the frame rod 102 through the tandem shaft bearing seats 112, and one end of the tandem shaft 111 is fixed on the frame rod 102. A number of the reeling pans 101 are installed on any one of the reeling pan shafts 104. The bottom end of the hydraulic rod 108 is connected with the frame, and the top is connected with the frame rod 102 to adjust the tilt angle of the reeling header 1.

Figure 6:
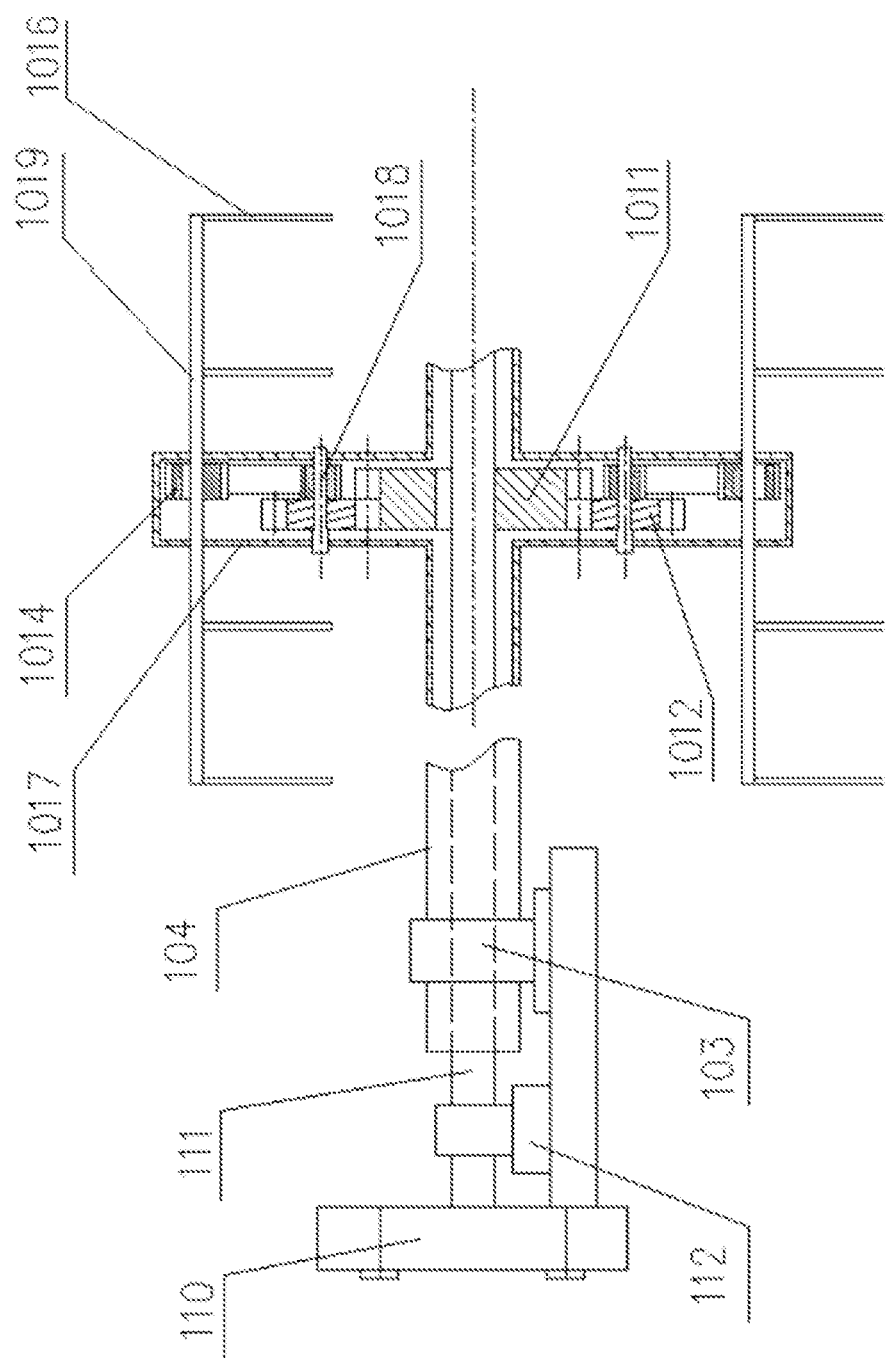
FIG. 6 is a schematic diagram of the structure of the reeling header.
Figure 7:
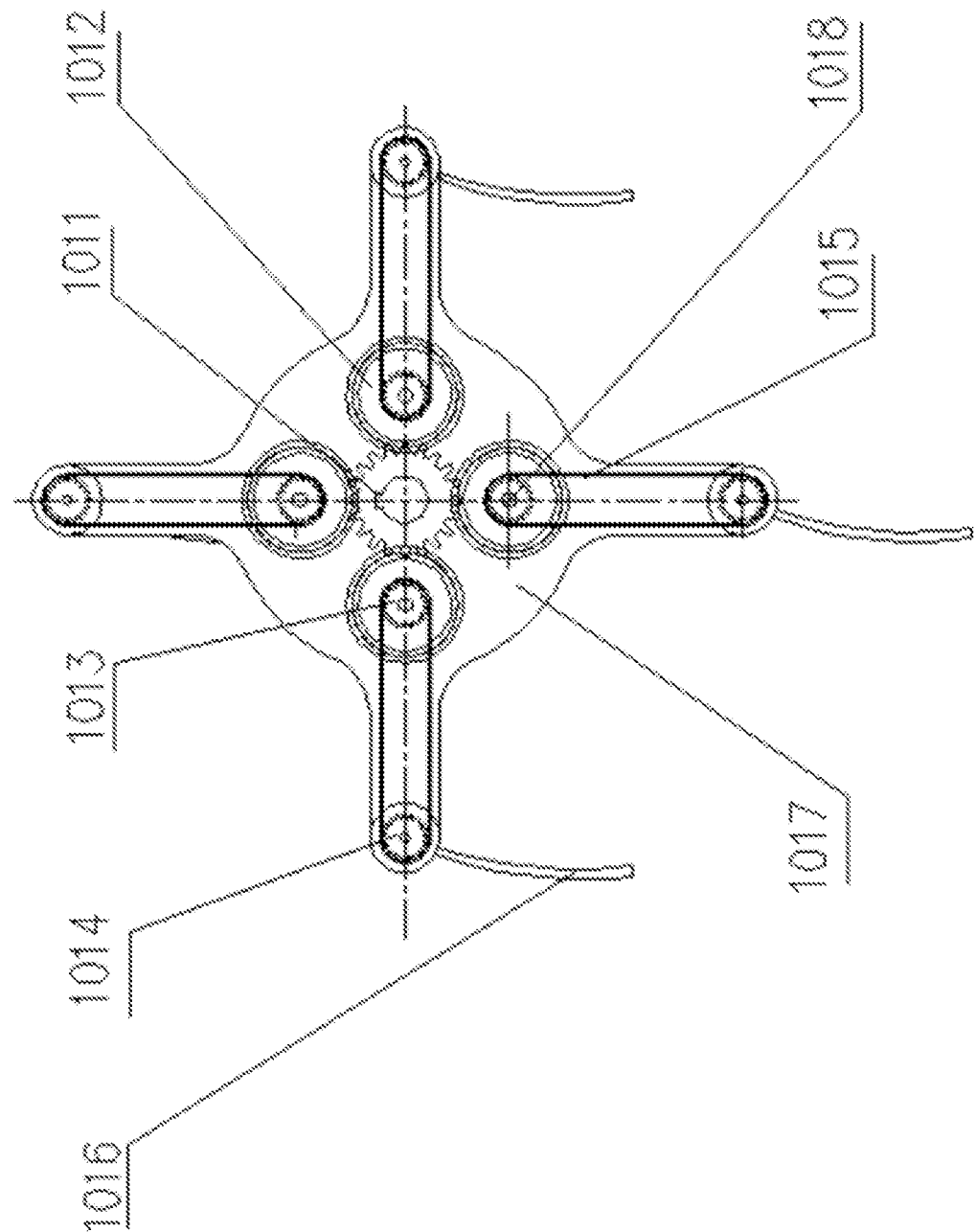
FIG. 7 is a schematic diagram of the structure of a reeling pan.

As shown in FIG. 6 and FIG. 7, any one of the reeling pans 101 comprises a central gear 1011, planetary gears 1012, elastic teeth 1016, a reeling pan shell 1017, planetary gear shafts 1018 and elastic tooth rods 1019. The reeling pan shell 1017 is mounted on the reeling pan shaft 104, the central gear 1011 is mounted on the tandem shaft 111, and the central gear 1011 is located on the center of reeling pan shell 1017. A number of planetary gears 1012 are evenly distributed in the center of the reeling pan shell 1017, and a number of planetary gears 1012 mesh with the central gear 1011. The planetary gears 1012 are mounted on the reeling pan shell 1017 through a planetary gear shaft 1018, and the reeling pan shell 1017 rotates to make several planetary gears 1012 rotate around the central gear 1011. A number of elastic tooth rods 1019 penetrating the reeling pan shell 1017 are installed on the edge of the reeling pan shell 1017, and the elastic tooth rods 1019 correspond to the planetary gears 1012, and any one of the elastic teeth rod 1019 and its corresponding planetary gear 1012 are drivingly connected. The elastic tooth rod 1019 is provided with elastic teeth 1016, and the elastic teeth 1016 on the same reeling pan 101 rotate synchronously, and the direction of the elastic teeth 1016 remains unchanged during the rotation.

Working process: Power is transmitted to the reeling pan shaft 104 to make it rotate, and the reeling pan shaft 104 drives the reeling pan shell 1017 to rotate. Since the tandem shaft 111 is fixed on the frame rod 102, the central gear 1011 is fixed, and the reeling pan shell 1017 rotates and drives the planetary gears 1012 to revolve. Since planetary gears mesh with the central gear 1011 and the central gear 1011 does not rotate, the planetary gears 1012 rotate and drive the primary sprocket 1013 fixedly connected to them to rotate. The primary sprocket 1013 drives the secondary sprocket 1014 to rotate through the chain 1015. The number of teeth of the central gear 1011 is Z1, the number of teeth of the planetary gear 1012 is Z2, the number of teeth of the primary gear 1013 is Z3, and the number of teeth of the secondary sprocket is Z4. The number of teeth between the transmission parts in the reeling pans satisfies the relationship (Z4·Z2)/(Z3·Z1)=1. Since the transmission ratio i=1, the rotation speed of the secondary sprocket 1014 is the same as the revolution speed of the reeling pan, but the direction is opposite, so that the angle of the elastic teeth remains unchanged during the working process.

The reeling pan 101 is mounted on the reeling pan shaft 104, and 4-6 reeling pans 101 are installed on any one of the reeling pan shafts 104. The outer diameter of the reeling pan 101 is 300 mm-350 mm. The length of the pan shaft 104 is 3000 mm-3500 mm, and the diameter is 35 mm-40 mm. The center distance between the adjacent reeling pan shafts 104 is 480 mm-550 mm, the length of the elastic teeth 1016 is 100 mm-150 mm. The distance between two adjacent elastic teeth along the axis is 120 mm~150 mm. The diameter of the double row sprocket 106 is 100 mm to 150 mm. The diameter of the single row sprocket 107 is 80 mm to 120 mm. One end of the frame rod 102 is equipped with a hydraulic rod 108 for adjusting a number of the inclination angle between the connecting line of the shaft center of the reeling pan 101 and the horizontal plane, the adjustment range is 5°-20°.

In order to realize the angle adjustment of the elastic teeth 1016, the present invention also comprises a device for adjusting the angle of the elastic teeth, which can realize automatic or manual adjustment.

The automatically adjusted elastic teeth angle adjusting device comprises a stepping motor and a brake. The brake is used for selectively fixing the tandem shaft 111 and the frame rod 102. The tandem shaft 111 is connected to the stepping motor in transmission, and is used to adjust the phase angle of the tandem shaft 111 when the brake is not working. When no adjustment is needed, the brake keeps working to make the tandem shaft 111 and the frame rod 102 fixedly connected. When the angle needs to be adjusted, the brake does not work, and the phase angle of the tandem shaft 111 is adjusted by a stepping motor, thereby driving the elastic teeth 1016 to rotate.

Figure 8:
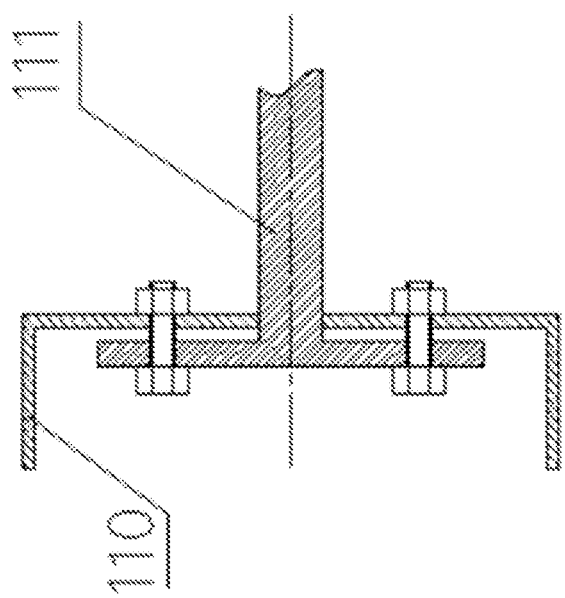
FIG. 8 is a schematic diagram of the coordination of an adjusting disk and a tandem shaft.

As shown in FIG. 8, the device for manually adjusting the angle of the elastic teeth comprises an adjusting disk 110 and a flywheel. One end of the tandem shaft 111 is fixed on the frame rod 102 through an adjusting disk 110. A number of circular holes are uniformly punched on the adjusting disk 110 along the circumferential direction. A flywheel is provided at one end of the tandem shaft 111, and a number of round holes are also punched. The flywheel and the adjusting disk 110 are fixed to the shaft by bolts. When the harvester is in a stopped state, remove the bolts, rotate the flywheel to make the circular holes of different angles correspond to the circular holes on the adjusting plate, and fix them with bolts to rotate the tandem shaft 111 to a certain angle, thereby driving the central gear 1011 to rotate to a certain angle. Since the reeling pan shaft 104 is not rotating at this time, the internal transmission structure changes the angle of the elastic tooth rod 1019 to realize the adjustment of the elastic teeth angle.

Figure 9:
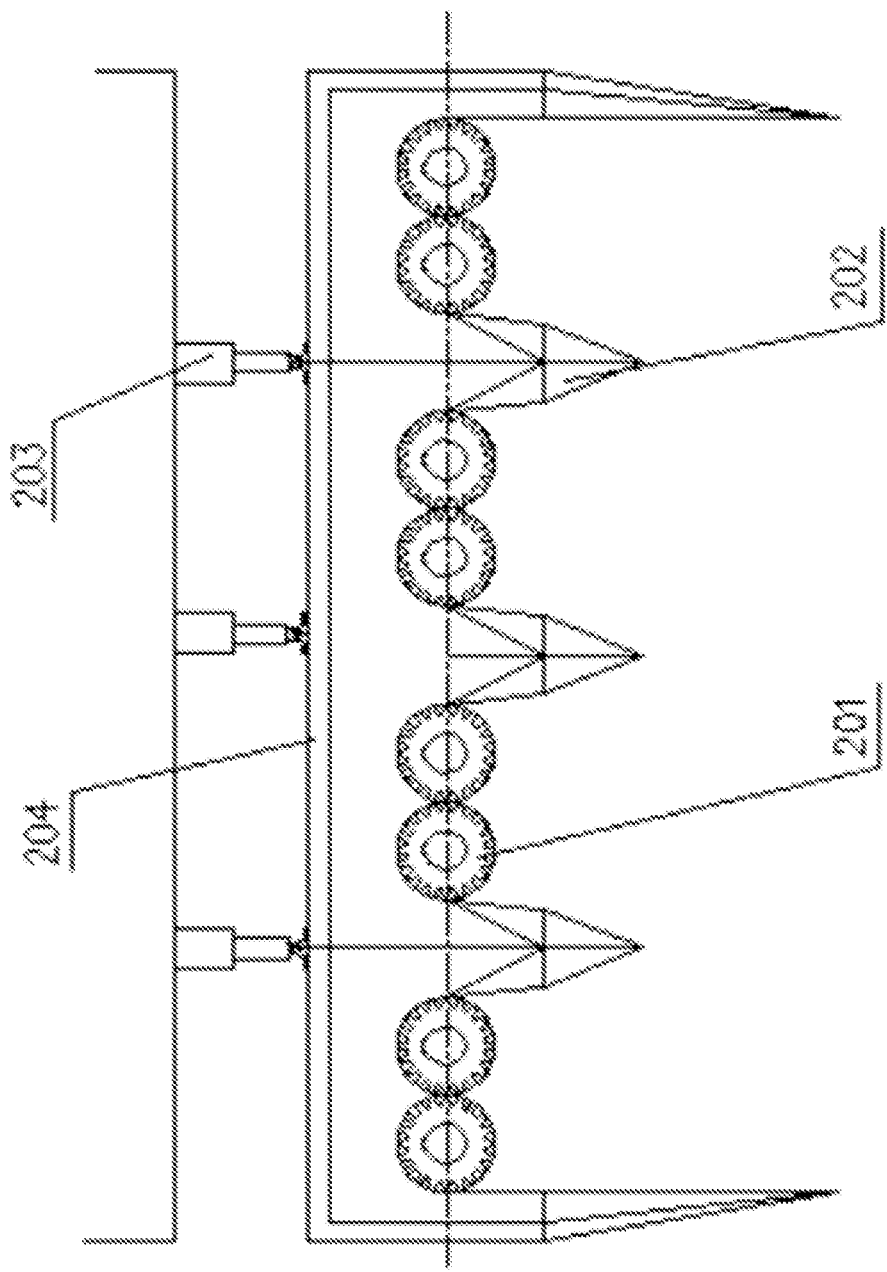
FIG. 9 is a top view of a rod crushing device.

As shown in FIG. 9, the rod crushing device 2 comprises rod crushing knife groups 201, rod splitters 202, tool post hydraulic rods 203 and a rod knife holder 204. The rod splitters 202 and the rod crushing knife group 201 are arranged alternately, and the rod splitters 202 are inserted and welded on the bottom of the rod knife holder 204. One end of the tool post hydraulic rod 203 is installed on the frame, and the other end is connected with the rod knife holder 204. The tool post hydraulic rods 203 control the rotation of the rod crushing device 2 around the bottom rotation, thereby adjusting the working angle of the rod crushing device 2.

Figure 10:
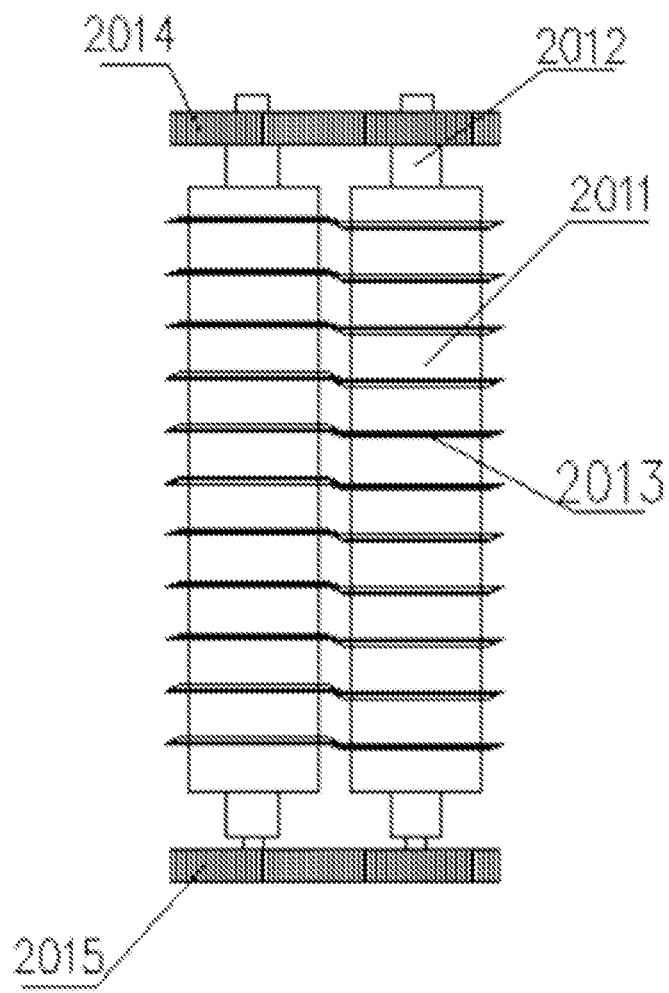
FIG. 10 is a schematic diagram of a rod crushing knife.
Figure 11:
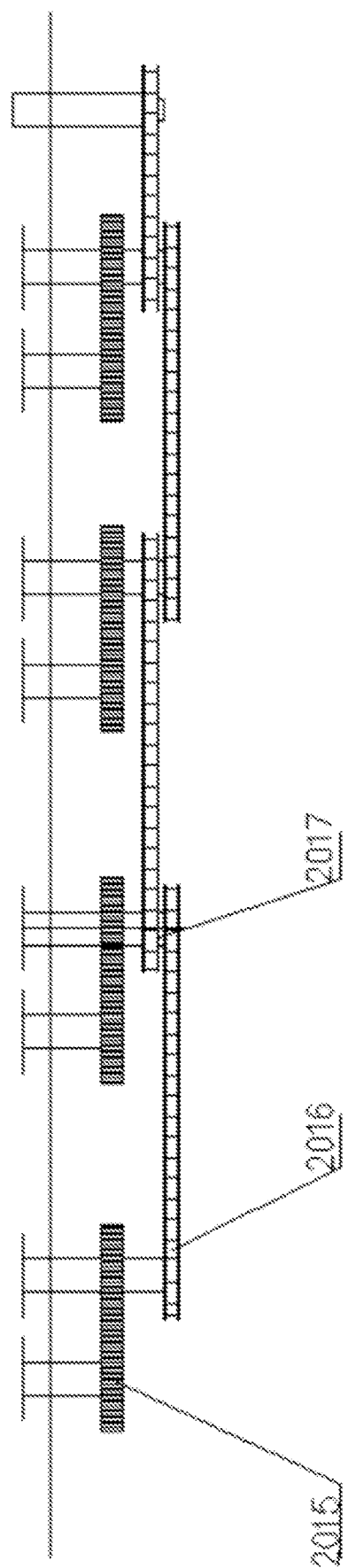
FIG. 11 is a schematic diagram of a rod crushing knife transmission.

As shown in FIG. 10 and FIG. 11, the rod crushing knife group 201 comprises stirring knife barrels 2011, stirring knife shafts 2012, ring blades 2013, upper stirring knife gears 2014, lower stirring knife gears 2015, stirring knife sprockets 2016 and stirring knife chains 2017. The two stirring knife shafts 2012 are supported in parallel on the rod knife holder 204, and each stirring knife barrel 2011 is installed on the stirring knife shaft 2012, and is arranged coaxially with the stirring knife shaft 2012. Both ends of each stirring knife shaft 2012 are respectively equipped with an upper stirring knife gear 2014 and a lower stirring knife gear 2015. One of the upper stirring knife gear 2014 and the lower stirring knife gear 2015 on the stirring knife shaft 2012 intermesh with the upper stirring knife gear 2014 and the lower stirring knife gear 2015 on the other stirring knife shaft 2012. The ring blades 2013 on the two stirring knife shafts 2012 are equally spaced, and the cutting edges of the ring blades 2013 on the two stirring shafts 2012 are opposite. The stirring knife shaft 2012 is directly or indirectly connected to the power device. The lower stirring knife gears 2015 and the stirring knife sprockets 2016 are connected below the stirring knife shaft 2012 by a flat key. The stirring knife chains 2017 connect the adjacent stirring knife sprockets 2016 and the power input shaft to realize transmission.

The length of the stirring knife shaft 2012 is 1000 mm-1200 mm, and the diameter is 80 mm-100 mm. Each stirring knife barrel 2011 is welded to the outside of the stirring knife shafts 2012 and has a diameter of 200 mm to 300 mm. The height of the ring blades 2013 is 60 mm-100 mm, and the distance between the adjacent ring blades 2013 on the stirring knife barrels 2011 is 120 mm-200 mm. The cutting edges of the adjacent ring blades are in opposite directions to realize the shearing of the stalk. The diameter of the upper stirring knife gears 2014 and the lower stirring knife gears 2015 is 500 mm to 600 mm. The stirring knife sprockets 2016 have a diameter of 450 mm to 550 mm. The stirring knife sprockets are arranged in a staggered manner at the lowest part of the stirring knife shafts, and are connected by the stirring knife chains 2017. The power of the stirring knife transmission box is unilaterally transmitted to each stirring knife shaft 2012 through the transmission mechanism under the stirring knife barrels.

Figure 12:
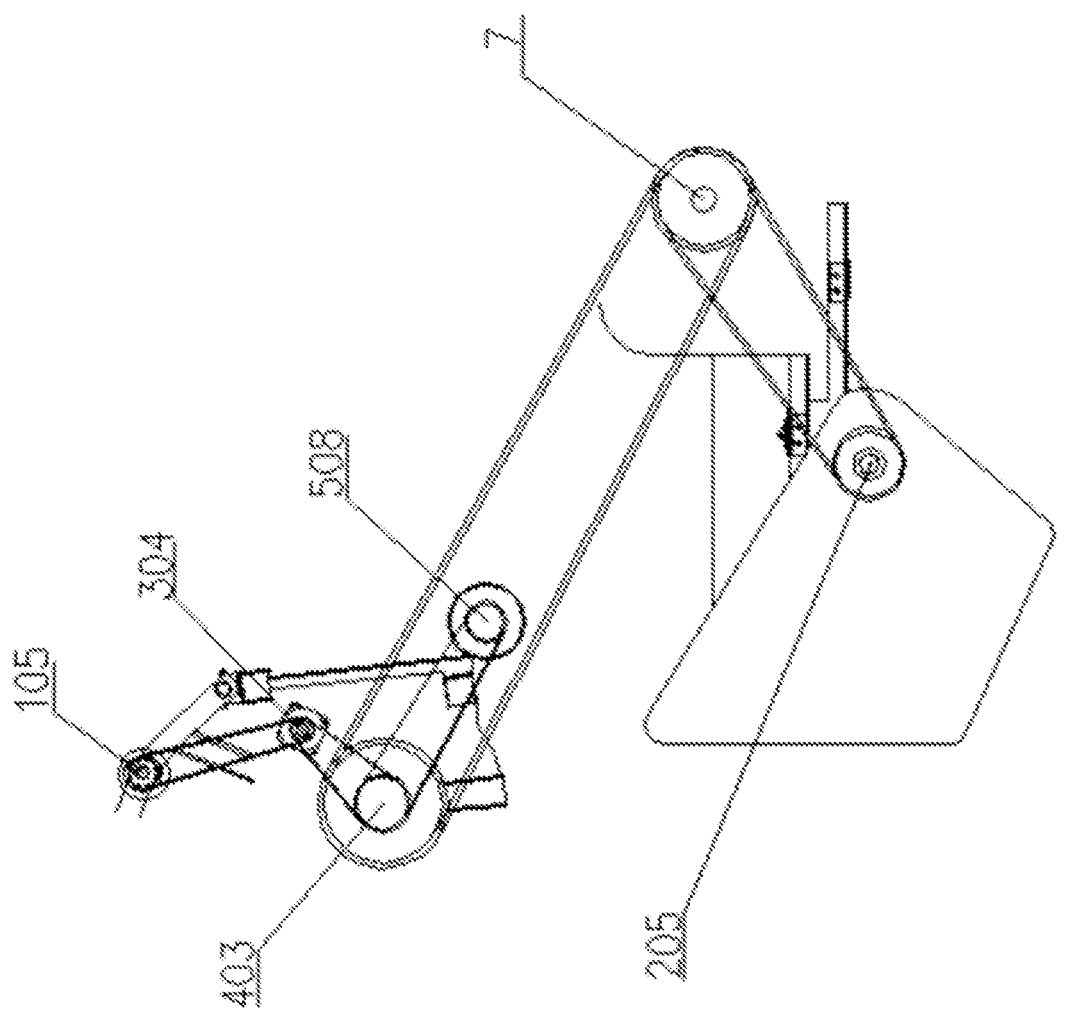
FIG. 12 is a schematic diagram of the transmission of the sorghum harvester.

As shown in FIG. 12, transmission components comprise an engine 7, an auger shaft 403, a cutting shaft 304 and a drive shaft 508. The engine 7 transmits power to the auger shaft 403 and the rod crushing device 2 through a belt. The auger shaft 403 transmits power to the drive shaft 508 and the cutting shaft 304 through a belt. The cutting shaft 304 transmits power to the reeling header shaft 105 through belts. The reeling header shaft 105 transmits power to the reeling pan shafts 104 through chains 1015.

The embodiments are preferred embodiments of the present invention, but the present invention is not limited to the above-mentioned embodiments. Without departing from the essence of the present invention, any obvious improvements, substitutions or variations that can be made by those skilled in the art fall within the protection scope of the present invention.

What is claimed is:

1. A sorghum cutting header with large feed volume and multiple reeling pans, the sorghum cutting header comprising a reeling header, a rod crushing device, and a reciprocating cutter device, the reciprocating cutter device is configured for cutting sorghum heads pulled by the reeling header, and the rod crushing device is located under the reeling header and is configured for cutting the remaining sorghum stalks;

the reeling header comprises a plurality of reeling pans, a frame rod, bearing seats, a plurality of reeling pan shafts, tandem shafts, and tandem shaft bearing seats; the reeling pan shafts are installed parallel to each other on the frame rod through the bearing seats, and the adjacent reeling pan shafts are connected by chains; power provided by a power device is transmitted to at least one of the reeling pan shafts through the chains; each of the tandem shafts penetrates inside a corresponding one of the reeling pan shafts, and each of two ends of the tandem shaft are supported on the frame rod through a corresponding one of the tandem shaft bearing seats, and one of the two ends of the tandem shaft is fixed on the frame rod; each of the reeling pan shafts is mounted with a plurality of the reeling pans.

2. The sorghum cutting header with large feed volume and multiple reeling pans according to claim 1, wherein each of the reeling pans comprises a central gear, a plurality of planetary gears, elastic teeth, a reeling pan shell, planetary gear shafts, and a plurality of elastic tooth rods; the reeling pan shell is mounted on the corresponding reeling pan shaft, the central gear is mounted on the corresponding tandem shaft, and the central gear is located on a center of the reeling pan shell; the plurality of planetary gears are evenly distributed in the center of the reeling pan shell, and the plurality of planetary gears mesh with the central gear; the planetary gears are mounted on the reeling pan shell through the planetary gear shaft, and the reeling pan shell rotates to make the planetary gears rotate around the central gear; the elastic tooth rods penetrating the reeling pan shell are installed on an edge of the reeling pan shell, and the elastic tooth rods correspond to the planetary gears one by one, and each of the elastic tooth rods is in transmission connection to a corresponding one of the planetary gears; each elastic tooth rod is provided with elastic teeth, and the elastic teeth on the same reeling pan rotate synchronously, and a direction of the elastic teeth remains unchanged during rotation.

3. The sorghum cutting header with large feed volume and multiple reeling pans according to claim 1, wherein one end of each of the reeling pan shafts is equipped with a double row sprocket, each of the reeling pan shafts and an adjacent one of the reeling pan shafts are connected by one of the chains.

4. The sorghum cutting header with large feed volume and multiple reeling pans according to claim 2, wherein the reeling header further comprises a device for adjusting an angle of elastic teeth, and the device for adjusting the angle of elastic teeth comprises a stepping motor and a brake; the brake is configured to selectively fix the tandem shaft and the frame rod; the tandem shaft is connected to the stepping motor in driving mode to adjust a phase angle of the tandem shaft when the brake is not working.

5. The sorghum cutting header with large feed volume and multiple reeling pans according to claim 2, wherein the reeling pan further comprises a device for adjusting an angle of elastic teeth, and the device for adjusting the angle of elastic teeth comprises an adjusting disk and a flywheel, and one end of the tandem shaft is fixed on the frame rod through the adjusting disk; the flywheel is provided at one end of the tandem shaft, and the flywheel is coaxially fixed with the adjusting disk, and a phase angle of the tandem shaft is adjusted by manually rotating the flywheel.

6. The sorghum cutting header with large feed volume and multiple reeling pans according to claim 2, wherein 4-6 reeling pans are installed on each of the reeling pan shafts, a center distance between the adjacent reeling pan shafts is 480 mm-550 mm, an outer diameter of each reeling pan is 300 mm-350 mm; a length of the elastic teeth is 100 mm-150 mm, a distance between two adjacent elastic teeth along an axis is 120 mm-150 mm.

7. The sorghum cutting header with large feed volume and multiple reeling pans according to claim 1, wherein one end of the frame rod is equipped with a hydraulic rod for adjusting an inclination angle between a connecting line of shaft centers of the reeling pans and a horizontal plane, and an adjustment range is 5°-20°.

8. The sorghum cutting header with large feed volume and multiple reeling pans according to claim 1, wherein the rod crushing device comprises rod crushing knife groups, rod splitters, tool post hydraulic rods and a rod knife holder; the rod splitters and the broken rod crushing knife groups are installed in a staggered arrangement on the rod knife holder; one end of the tool post hydraulic rods is installed on the rod knife holder for adjusting a cutting angle.

9. The sorghum cutting header with large feed volume and multiple reeling pans according to claim 8, wherein each rod crushing knife group comprises stirring knife barrels, two stirring knife shafts, ring blades, upper stirring knife gears, and lower stirring knife gears; the two stirring knife shafts are supported in parallel on the rod knife holder, each stirring knife barrel is installed on each of the stirring knife shafts; both ends of each stirring knife shaft are respectively equipped with an upper stirring knife gear and a lower stirring knife gear; the upper stirring knife gear and the lower stirring knife gear on one of the stirring knife shafts intermesh with the upper stirring knife gear and the lower stirring knife gear on the other one of the stirring knife shafts; the ring blades on the two stirring knife shafts are equally spaced, and cutting edges of the ring blades on the two stirring shafts are opposite; one of the stirring knife shafts is directly or indirectly connected to the power device.

10. A sorghum harvester, comprising the sorghum cutting header with large feed volume and multiple reeling pans according to claim 1, a reeling header, a screw feeder, an ear head conveyor, a straw helper, an engine, a grain tank, and a frame; wherein one end of the reeling header is installed on the frame through a rotating pair, and the straw helper installed on the frame under the reeling header; the screw feeder is located behind the reciprocating cutter device; the ear head conveyor is installed at an outlet of the screw feeder, and is configured to transport the sorghum head to the grain tank; the engine is configured to provide power of the reeling header, the screw feeder, and the ear head conveyor respectively.

* * * * *